(12) United States Patent
Sachithanathan et al.

(10) Patent No.: US 9,189,176 B2
(45) Date of Patent: Nov. 17, 2015

(54) IDENTIFYING NEWLY CONNECTED PRINTERS

(75) Inventors: Ramaswamy Sachithanathan, Singapore (SG); Tony Blasio, San Diego, CA (US); Siddharth Chutkay Sudershanrao, Singapore (SG)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 236 days.

(21) Appl. No.: 13/193,376

(22) Filed: Jul. 28, 2011

(65) Prior Publication Data

US 2013/0027740 A1    Jan. 31, 2013

(51) Int. Cl.
*G06F 3/12* (2006.01)
(52) U.S. Cl.
CPC ............ *G06F 3/1204* (2013.01); *G06F 3/1273* (2013.01); *G06F 3/1285* (2013.01)
(58) Field of Classification Search
None
See application file for complete search history.

(56) References Cited

U.S. PATENT DOCUMENTS

| 6,301,012 | B1 | 10/2001 | White et al. | |
| 7,190,478 | B2* | 3/2007 | Caffary et al. | 358/1.15 |
| 7,600,227 | B2 | 10/2009 | Brockway et al. | |
| 7,689,673 | B2 | 3/2010 | Kemp et al. | |
| 7,711,859 | B2 | 5/2010 | Natarajan et al. | |
| 8,294,939 | B2* | 10/2012 | Fujimori et al. | 358/1.15 |
| 2003/0223092 | A1* | 12/2003 | Caffary et al. | 358/1.15 |
| 2004/0190052 | A1* | 9/2004 | Sando | 358/1.15 |
| 2008/0192294 | A1* | 8/2008 | Reddy et al. | 358/1.15 |
| 2009/0059272 | A1 | 3/2009 | Matsushita et al. | |
| 2009/0147299 | A1* | 6/2009 | Tetu | 358/1.15 |
| 2010/0211878 | A1 | 8/2010 | Spijkerbosch et al. | |

OTHER PUBLICATIONS

Brown, P.; "A Cups and eCS (OS/2) How to" 34 pages.

* cited by examiner

*Primary Examiner* — Marcus T Riley
(74) *Attorney, Agent, or Firm* — Mahamedi Paradice LLP

(57) ABSTRACT

In one embodiment, actual usage data is obtained for a printer connected to a network. The actual usage data is compared to a usage model for a newly connected printer. The printer is identified as newly connected in response to determining the actual usage data is consistent with the usage model. Information that the printer is newly connected is displayed.

20 Claims, 8 Drawing Sheets

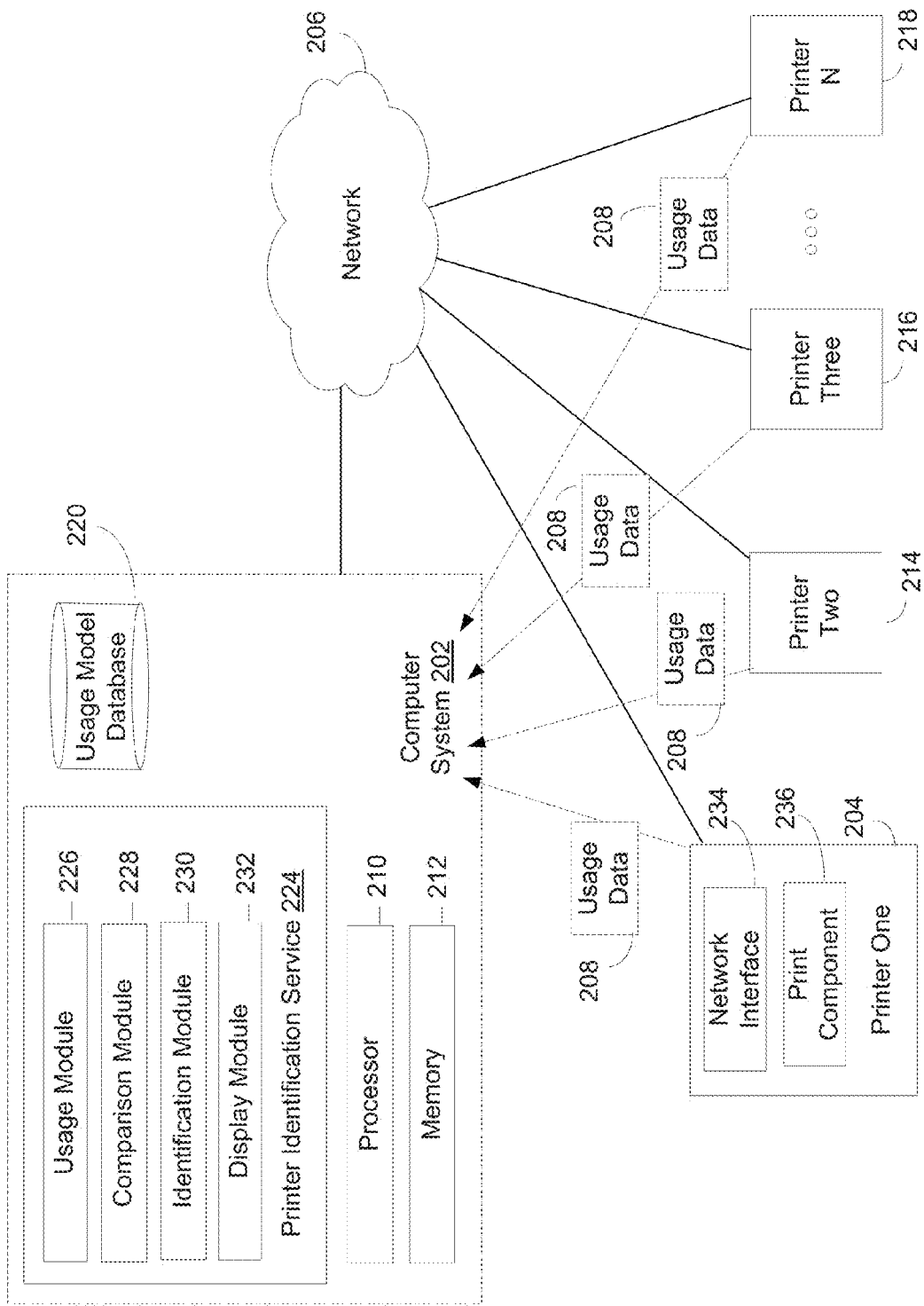

| 208 Usage Data | total pages printed | pages printed while connected to the network | pages printed while connected to the network via a wired connection | pages printed while connected to the network via a wireless connection |
| --- | --- | --- | --- | --- |
| Printer One | 8 | 0 | 0 | 0 |
| Printer Two | 200 | 150 | 100 | 50 |
| Printer Three | 35 | 30 | 5 | 25 |
| Printer N | 1000 | 990 | 90 | 900 |

FIG. 3A

| 310 Usage Model for Newly Connected Printers | total pages printed | pages printed while connected to the network | pages printed while connected to the network via a wired connection | pages printed while connected to the network via a wireless connection |
| --- | --- | --- | --- | --- |
| | < 10 | 0 | 0 | 0 |

FIG. 3B

CHANGE REFERENCES TO MAC AND IP
ADDRESSES IN APPLICATION"

"CHANGE ALL MAC ADDRESSES, LAST 4 DIGITS & LAST 2 LETTERS USING A-F

Checking network environment ...

Select a printer to install or select My Printer is Not Listed to continue:
Printers found on the network:

| Model Name | IP Address | MAC Address | Network Type |
|---|---|---|---|
| HP Officejet 6500 E710n-z | 192.168.13.251 | 1CC1DE3024CF | Wired (Ethernet) |
| HP Officejet 6500 E710n-z | 192.168.13.6 | 1CC1DE8753AE | Wired (Ethernet) |
| HP Officejet 6500 E710n-z | 192.168.13.221 | 1CC1DE7832BE | Wired (Ethernet) |
| HP Officejet 6500 E710n-z | 192.168.13.255 | 1CC1DE4261AD | Wired (Ethernet) |

☐ My printer is not listed

[ Help ]          [ Next ]   [ Cancel ]

Checking network environment ...

Select a printer to install or select My Printer is Not Listed to continue:
Printers found on the network:

| Model Name | IP Address | MAC Address | Network Type |
|---|---|---|---|
| HP Officejet 6500 E710n-z | (NEW!) 192.168.13.251 | 1CC1DE3024CF | Wired (Ethernet) |
| HP Officejet 6500 E710n-z | 192.168.13.6 | 1CC1DE8753AE | Wired (Ethernet) |
| HP Officejet 6500 E710n-z | 192.168.13.221 | 1CC1DE7832BE | Wired (Ethernet) |
| HP Officejet 6500 E710n-z | 192.168.13.255 | 1CC1DE4261AD | Wired (Ethernet) |

☐ My printer is not listed

[ Help ]          [ Next ]   [ Cancel ]

| 508 — Usage Data | 602 — system uptime in hours | 604 — printer clock time |
|---|---|---|
| 504 — Printer One | 0.3 | 15:10 Feb. 2, 2010 |
| Printer Two | 30 | 13:00 Aug. 15, 2011 |
| Printer Three | 10 | 13:02 Aug. 15, 2011 |
| Printer N | 1000 | 12:59 Aug. 15, 2011 |

FIG. 6A

| 606 — Usage Model for Newly Connected Printers | 608 — system uptime in hours | 610 — difference between printer clock time and baseline time of 13:00 Aug. 15, 2011 |
|---|---|---|
| | < 0.5 | > 30 minutes |

FIG. 6B

IDENTIFYING NEWLY CONNECTED PRINTERS

BACKGROUND

Adding a printer to a computer network may include executing installation software (e.g., software to set up the printer, to install print drivers, print spoolers, etc.) at a desktop computer, laptop computer, server or other computing device already connected to the network. Execution of the printer installation software may include unpacking of files supplied in a compressed form, copying printer-related programming to computing devices on the network, tailoring the programming to match the printer and user preferences, and providing information about the printer and the programming to an operating system.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIGS. 1 and 2 are block diagrams illustrating systems according to various embodiments.

FIG. 3A is an example of actual usage data according to various embodiments.

FIG. 3B is an example of a usage model for a newly connected printer according to various embodiments.

FIGS. 4A and 4B provide example screenshots during identification of a newly connected printer, according to various embodiments.

FIG. 6A is an example of actual usage data according to various embodiments.

FIG. 6B is an example of a usage model for a newly connected printer according to various embodiments.

The same part numbers designate the same or similar parts throughout the figures.

DETAILED DESCRIPTION OF EMBODIMENTS

Figure 1:
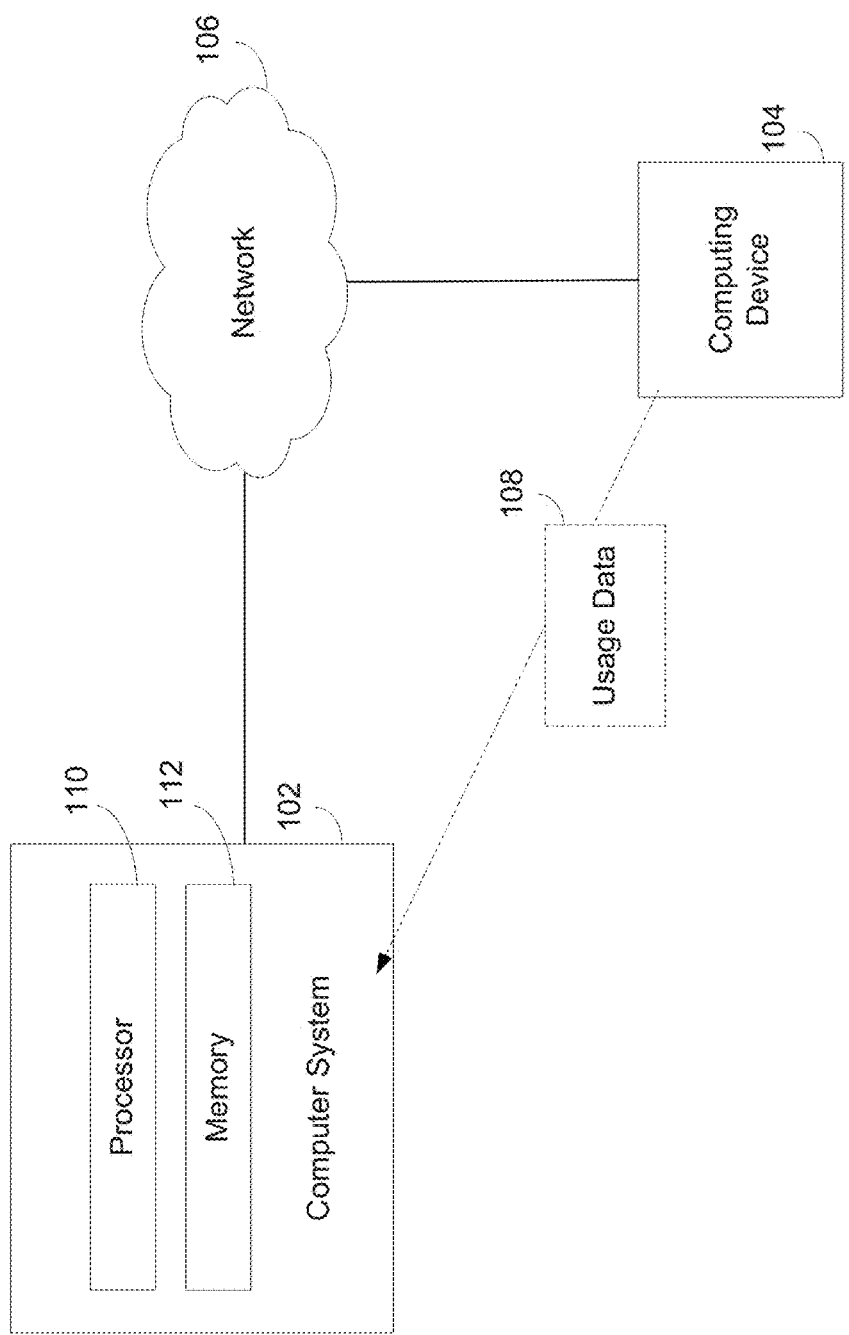

Printer installation software commonly will display a list of printers connected to the network, and request input from a user to identify the printer that is newly connected and is being set up. In some scenarios, however, it can be difficult for a user to identify the printer that is newly connected. In an example, in a business computer network there often is more than one printer with a same or similar manufacturer and model information. Such printers may be indistinguishable when identified by the printer installation software as a list of network-connected printers. The same or similar printers may be single function printers with no display screen or a limited display screen. In this example, in order to identify the newly connected printer among listed printers it may be necessary for a user to walk to the printer, press a combination of buttons at the printer control panel to print a network configuration report, and then identify a printer name, IP address or other identifier from the printed report. If the user does not know the necessary button combination in advance, the user may need to refer to the printer documents/manuals to find the button combination. Further, printing of a network configuration report at the new printer necessitates that the printing supplies be installed.

The above-described sequence of steps can be detrimental to the user experience during printer installation. Accordingly, various embodiments described herein were developed in an effort to improve the user experience during setup of a network by automatically identifying newly connected network printers. In an embodiment, after obtaining actual usage data for a printer connected to a network, the actual usage data is compared to a usage model for a newly connected printer. The printer can be identified as newly connected in response to determining the actual usage data is consistent with the usage model. After the determination, information that the printer is newly connected is displayed to a user. Advantages of the various embodiments disclosed herein include a better out-of-the-box and installation experience for the user due to a simplified process, a reduction in install time, and elimination of printing of configuration pages during installation. Additional advantages from the perspective of the supplier of the printer are a reduced number of customer support calls and associated savings.

As used herein, "printer" or "printing device" refers to any electronic device that prints and includes multifunctional electronic devices that perform additional functions such as scanning and/or copying. A "network" refers to a collection of computing devices interconnected by communications channels that facilitate communications and allows sharing of resources and information among the interconnected devices. In examples, the network may be a proprietary network, a secured network, an open network, an intranet, an extranet, an internet or the Internet. An "identifier" for a printer refers to something that identifies, indicates, or names a printer. "System uptime" refers to a measurement of time that a device is connected to a network, e.g., an elapsed time since the device is connected to the network without interruption, or an elapsed time since a network stack is initiated. "Clock time" of a printer refers to a time of day and/or date as reflected by a program executed at a processor within the printer. "Clock time" of a computer refers to a time of day and/or date as reflected by a program executed at a processor within the computer. "Clock" refers to a program executed at a computer that provides a time of day and/or date.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows a computer system 102 and a computing device 104 connected to a network 106. Computer system 102 represents generally any computing device or group of computing devices capable of sending network requests and data to, and otherwise communicating with, computing device 104 via network 106. In embodiments, computer system 102 may be or include a desktop computer, laptop computer, server, mobile computing device, tablet computer, and/or any other computing device.

Computing device 104 represents generally any computing device or group of computing devices capable of sending networks requests and data to, and otherwise communicating with, computer system 102. In embodiments, computer system 102 may be or include a printer, all-one-one printing and scanning device, desktop computer, laptop computer, mobile computing device, smart phone tablet computer, and/or any other computing device.

Actual usage data 108 for a printer connected to network 106 is obtained at computer system 102 from computing device 104. In an example, computing device 104 may be the network-connected printer. In another example, computing device 104 may be a print server that collects and stores data regarding the network-connected printer.

The actual usage data 108 for the printer is compared to a usage model for a newly connected printer. The usage model may be stored in memory 112 at computer system 102, or may be stored at a computing device distinct from computer system 102 that is accessible to computer system 102 via the network. In an example, actual usage data 108 that is obtained at computer system 102 and the usage model both consider a number of pages printed by the network-connected printer.

For instance, the obtained actual usage data may demonstrate that the network-connected printer has printed ten pages, and the usage model may state that a network-connected printer can be classified as new if no more than ten pages have been printed. In another example, the actual usage data 108 and the model include a number of pages printed while connected to the network 106. In another example, the actual usage data 108 and the model include a number of pages printed while connected to the network 106 via a wired connection. In another example, the actual usage data and the model include a number of pages printed while the printer is connected to the network 106 via a wireless connection. In another example, the actual usage data and the model include system uptime on the network 106. In yet another example, the actual usage data includes a clock time for the printer, and the model includes an accepted difference between the printer clock time and a baseline time.

Upon determining that the actual usage data is consistent with the usage model, the printer is identified as newly connected to the network. Information that the printer is newly connected can then displayed to a user that is interacting with the printer installation software, e.g., displayed via a monitor, touchscreen or other display device that is part of computer system 102. In this manner, the printer is automatically identified as newly connected during the printer software installation process, without the need for any affirmative actions by a user.

The functions and operations described with respect to computer system 102 may be implemented as a computer-readable storage medium containing instructions executed by a processor (e.g., processor 110) and stored in a memory (e.g., memory 112). In a given implementation, processor 110 may represent multiple processors, and memory 112 may represent multiple memories. Processor 110 represents generally any instruction execution system, such as a computer/processor based system or an ASIC, a computer, or other system that can fetch or obtain instructions or logic stored in memory 112 and execute the instructions or logic contained therein. Memory 112 represents generally any memory configured to store program instructions and other data.

FIG. 2 is a block diagram that includes a computer system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, ASICs, embedded controllers, hardwired circuitry, etc.), or some combination of these.

As illustrated in FIG. 2, computer system 202 may be a single physical device or it may be distributed among multiple physical devices connected over a network (e.g., the Internet). For example, computer system 202 may represent a cloud computing infrastructure (i.e., the cloud). In a cloud computing infrastructure, various components/modules of computer system 202 may share resources and/or act in concert even though they might be in different physical locations and/or operating on different physical devices.

FIG. 2 shows computer system 202, printer one 204, printer two 214, printer three 216, and printer N 218 connected to a network 206. Computer system 202 includes a usage model database 220 and a printer identification service 224. The printer identification service 224 is configured to identify any of printers one, two, three or N that are newly connected to the network 206, and includes a usage module 226, a comparison module 228, an identification module 230, and a display module 232.

Printers one, two, three and N represent generally computing devices that are operable to produce printed output and to send and receive communications and content over the network 206. Printer one 204 is shown to include a network interface 234 and a print component 236. Network interface 228 represents generally any combination of hardware and programming configured for electronically connecting printer one 204 to network 206. Print component 236 represents generally any combination of hardware and programming configured to produce printed output.

Usage module 226 obtains actual usage data 208 for printer one 204, printer two 214, printer three 216 and printer N 218 from the printers via the network 206. Moving to FIG. 3A, in this example the usage data includes a total number of pages printed 302, a number of pages printed while connected to the network 304, a number of pages printed while connected to the network 206 via a wired connection 306, and a number of pages printed while connected to the network 206 via a wireless connection 308.

Returning to FIG. 2, comparison module 228 compares actual printer usage data 208 for printer one 204, printer two 214, printer three 216 and printer N 218 to a usage model 310 (FIG. 3B) for a newly connected printer. In this example the usage model is stored at a usage model database 220 located within computer system 202 and is accessible to printer identification service 224. Returning to FIG. 3A, an example of obtained usage data 208 for printer one 204 includes a count of total number of pages printed 302 at eight pages, a count of number of pages printed while connected to the network 304 at zero pages, a count of the number of pages printed while connected to the network 206 via a wired connection 306 at zero pages, and a count of the number of pages printed while connected to the network 206 via a wireless connection 308 at zero pages. Moving to FIG. 3B, usage model 310 provides an example of a usage model for newly connected printers. According to this example, a printer is classified as newly connected to the network 206 (FIG. 2) according to the usage model 310 if each the following is true: the total number of pages printed is less than ten pages 312, the number of pages while connected to the network is zero pages 314, the number of pages printed while connected to the network via a wired connection is zero pages 316, and the number of pages printed while connected to the network via a wireless connection is zero pages 318.

Returning to FIG. 2, identification module 230 identifies printer one 204 as newly connected in response to determining the actual usage data is consistent with the usage model. Returning to the example of FIGS. 3A and 3B, printer one 204 is identified as a newly connected printer because the usage data points for printer one (total number of pages printed 302, pages printed while connected to the network 304, pages printed while connected to the network via a wired connection 306, and pages printed while connected to the network via a wireless connection 308) are consistent with the usage model for newly connected printers 310. In other embodiments, the usage data 208 and the usage model 310 may include additional or different printer data points. Further, in other embodiments the usage model 310 may include a different or additional formulas or equations for determining that a printer is newly connected. For example, in an embodiment the usage model 310 may include less than, or more than, all of the usage data discussed with reference to FIGS. 2, 3A and 3B (total pages printed 302, pages printed while connected to the network 304, pages printed via a wired connection 306 and pages printed via a wireless connection 308). In another example, a usage model 310 may be structured to conclude that a printer is newly connected to a network if less than all of the usage data 208 points (e.g., three of four data points considered) are consistent with the model.

Returning to FIG. 2, display module 232 causes a display information of information that a printer (in this example printer one 204) is newly connected. The display may be via monitor, touchscreen or other display device included within computer system 202, or may occur at a computing device connected to computer system 202 via the network 206.

Moving to FIG. 4A, first screenshot 402 is an example display at a display device, the display being caused by printer identification service 224 (FIG. 2) executing at computer system 202 (FIG. 2), FIG. 4A illustrates a display as a software application checks the environment of network 206 (FIG. 2) for connected devices, and lists printer one 204 (FIG. 2), printer two 214 (FIG. 2), printer three 216 (FIG. 2), and printer N 218 as being connected to network 206 (FIG. 2). However, as each of printers one, two, three and N are of the same model name, it is not apparent to a user which is the newly connected printer.

Moving to the example second screenshot 404 in FIG. 4B, information that printer one 204 (FIG. 2) is a newly connected printer is displayed to a user via a display device after identification of printer one 204 (FIG. 2) as a newly connected printer. In the example of FIG. 4B, display of the information that the printer is newly connected occurs via the addition of the "NEW!" icon 406 adjacent to the HP Officejet 650 e710n-z model printer with IP address 192.168.13.251. For purposes of this specification and the appended claims, a "display device" refers to any combination of hardware and programming configured to exhibit or present a message or other information for perception by a user, and can include, but is not limited to, a visual, tactile or auditory display. The display device may be a monitor, a touchscreen, a projection device, or other means of presenting a visual display of a message. In other examples, the display device may be Braille display device or other means of presenting a tactile display. In other examples, the display device may include a speaker to enable an auditory display of the message.

A user viewing the display of FIG. 4B is thus equipped with information identifying the printer one 204 (FIG. 2) as the new printer on the network 206. In examples, a user might proceed with the installation of printer applications to enable printing at printer one 204 by clicking on or otherwise interacting with the name or an icon for printer one 204, the 192.168.13.251 IP address for printer one 204, or the "NEW!" icon 406. In yet another example, a user might proceed with the installation of printer applications to enable printing at printer one 204 copying and pasting, or otherwise entering, the 192.168.13.251 IP address information into an interactive portions of a display provided by the printer installation software.

Returning to FIG. 2, the functions and operations described with respect to computer system 202 may be implemented as a computer-readable storage medium containing instructions executed by a processor (e.g., processor 210) and stored in a memory (e.g., memory 212). In a given implementation, processor 210 may represent multiple processors, and memory 212 may represent multiple memories. Processor 210 represents generally any instruction execution system, such as a computer/processor based system or an ASIC, a computer, or other system that can fetch or obtain instructions or logic stored in memory 212 and execute the instructions or logic contained therein. Memory 212 represents generally any memory configured to store program instructions and other data.

Figure 5:
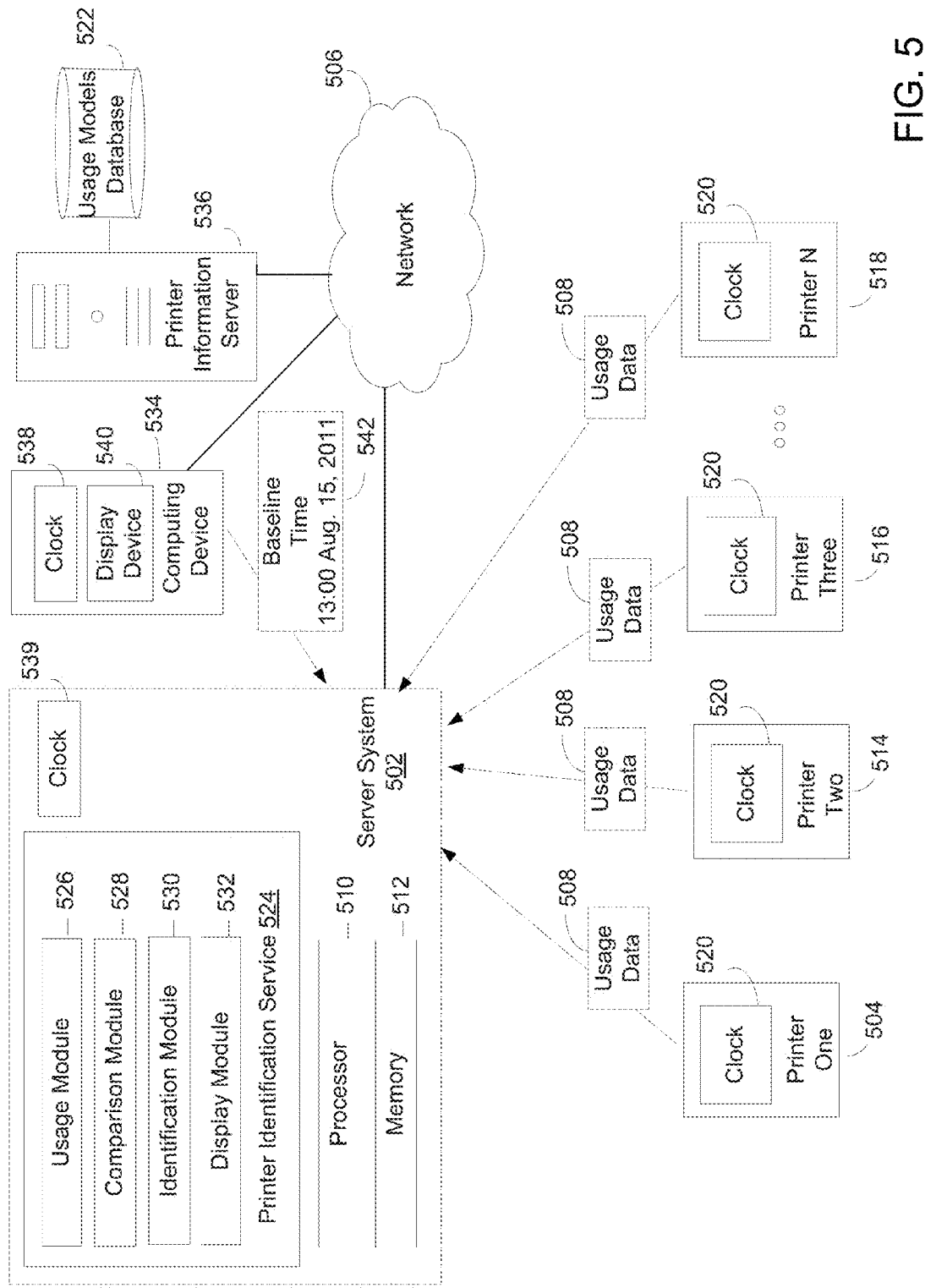
FIG. 5 is a block diagram illustrating a system according to various embodiments.

FIG. 5 is a block diagram that includes a computer system according to various embodiments. FIG. 5 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, ASICs, embedded controllers, hardwired circuitry, etc.), or some combination of these.

As illustrated in FIG. 5, server system 502 may be a single physical device or it may be distributed among multiple physical devices connected over a network (e.g., the Internet). For example, server system 502 may represent a cloud computing infrastructure (i.e., the cloud). In a cloud computing infrastructure, various components/modules of server system 502 may share resources and/or act in concert even though they might be in different physical locations and/or operating on different physical devices.

FIG. 5 shows server system 502, printer one 504, printer two 514, printer three 516, printer N 518, computing device 534 and printer information server 536 connected to a network 506. Server system 502 includes a printer identification service 524 configured to identify any of printers one, two, three or N that are newly connected to the network 506, and includes a usage module 526, a comparison module 528, an identification module 530, and a display module 532.

Printers one, two, three and N represent generally computing devices that are operable to produce printed output and to send and receive communications and content over the network 506. Printers one, two, three and N are shown to include printer clocks 520, representing generally any combination of hardware and programming configured to track a time of day and/or date.

Computing device 534 is connected to server system 502 and printer identification service 524 via the network 506. Computing device 534 represents generally any computing device or group of computing devices capable of sending network requests and data to, and otherwise communicating with, server system 502 via network 506. In embodiments, computing device 534 may be or include a desktop computer, laptop computer, server, mobile computing device, tablet computer, and/or any other computing device. In this example, we assume that printer installation software executes at computing device 534 and causes computing device 534 to communicate with printer identification service 524 running at server system 502 to identify newly connected printers.

Upon printer identification service 524 receiving a request from computing device 534 to identify newly connected printers, usage module 526 obtains actual usage data 508 for printer one 504, printer two 514, printer three 516 and printer N 518 from the printers via the network 506. Moving to FIG. 6A, in this example the obtained usage data includes measurements of system uptime 602 and printer clock times 604 for each of the printers. In this example, system uptime 602 is measured in hours, and the printer clock time 604 includes a data and a time expressed in twenty-four hour notation.

Returning to FIG. 5, comparison module 528 compares actual printer usage data 508 for printer one 504, printer two 514, printer three 516 and printer N 518 to a usage model 606 (FIG. 6B) for a newly connected printer. In this example, the usage model 606 (FIG. 6B) is stored at a database of usage models 522 that is accessible to printer identification service 524 via printer information server 536 over network 506. Printer information server 536 represents generally any computing device or group of computing devices capable of sending network requests and data to, and otherwise communicating with, server system 502 via network 506.

Returning to FIG. 6A, an example of actual usage data 508 for printer one 504 includes a system uptime of 0.3 hours and a printer clock time of 15:10 Feb. 2, 2010. Moving to FIG. 6B, usage model 606 provides an example of a usage model for newly connected printers. According to this example, a printer is classified as newly connected to the network 506 (FIG. 5) according to the usage model if each the following is true: the total measured system uptime for the printer is less than 0.5 hours, and the difference between the printer clock time and a baseline time is greater than thirty minutes. It should be noted that a "baseline time" can be any expression of a time of day and/or date, including, but not limited to a computer clock time, a time of day and/or date stored in memory, a time of day and/or date retrieved from a lookup table.

In this example the "15:10 Feb. 2, 2010" clock time for printer one 504 represents a default value (the date of manufacturing) that is set within the printer one 506 clock during manufacturing, with the expectation that the clock will be reset at the time that printer one 504 prints its first print job. In another example, the clock of printer one 504 may, during manufacturing of the printer, be set to a default abstract time with the expectation that the clock will be reset at the time that printer one 504 prints its first print job (e.g., "22:22 Feb. 2, 2222"). In yet another example, a real time clock for printer one 504 may be set during manufacturing to Coordinated Universal Time ("UTC").

Returning to FIG. 5 and the example of FIGS. 5, 6A and 6B, the baseline time referenced by usage model 606 is a baseline time 542 of "13:00 Aug. 15, 2011" read from a computer clock 538 within computing device 534. In another example, the baseline time 542 may be read from a computer clock 539 located within server system 502. In another example, the baseline time may be a time that is not a calculated time, but rather is a time that is stored in memory or retrieved from a lookup table. For instance, a usage model can be used that considers a difference between a printer clock time and a baseline time, wherein the baseline time is a default time that printer clocks are known to be set to during manufacturing of certain models of printers.

Returning to FIG. 5, identification module 530 identifies printer one 504 as a newly connected printer in response to determining the usage of printer one 504 as reflected by the actual usage data 508 is consistent with the usage model 606 (FIG. 6B). Returning to the example of FIGS. 6A and 6B, printer one is identified as a newly connected printer because the usage data points for printer one (system uptime of 0.3 hours 602 and a difference of more than thirty minutes between printer clock time 604 and a baseline time 542) are consistent with the usage model for newly connected printers 606. In this example, identification module 530 does not identify printer two 514, printer three 516, or printer N 518 as newly connected printers as the actual usage data for those printers is not consistent with the usage model 606 (FIG. 63). More specifically, the system uptime 602 actual usage data for printer two 514 of thirty hours, for printer three 516 of ten hours, and for printer N 518 of one thousand hours exceeds the usage model 606 system uptime of less than 0.5 hours. Further, the differences between the "13:00 Aug. 15, 2011" printer clock time of printer two 514, the "13:02 Aug. 15, 2011" printer clock time of printer three 516, and the "12:59 Aug. 15, 2011" printer dock time of printer N 518, and the baseline time, are less than the usage model 606 difference of more than thirty minutes.

In other embodiments, the usage data 508 and the usage model 606 may include additional or different printer data points. Further, in other embodiments the usage model 606 may include a different or additional formulas or equations for determining that a printer is newly connected.

Returning to FIG. 5, display module 532 causes a display information of information that a printer, in this example printer one 504, is newly connected. In this example the display occurs at a display device 540 included within computing device 534.

The functions and operations described with respect to server system 502 may be implemented as a computer-readable storage medium containing instructions executed by a processor (e.g., processor 510) and stored in a memory (e.g., memory 512). In a given implementation, processor 510 may represent multiple processors, and memory 512 may represent multiple memories. Processor 510 represents generally any instruction execution system, such as a computer/processor based system or an ASIC, a computer, or other system that can fetch or obtain instructions or logic stored in memory 512 and execute the instructions or logic contained therein. Memory 512 represents generally any memory configured to store program instructions and other data.

Figure 7:
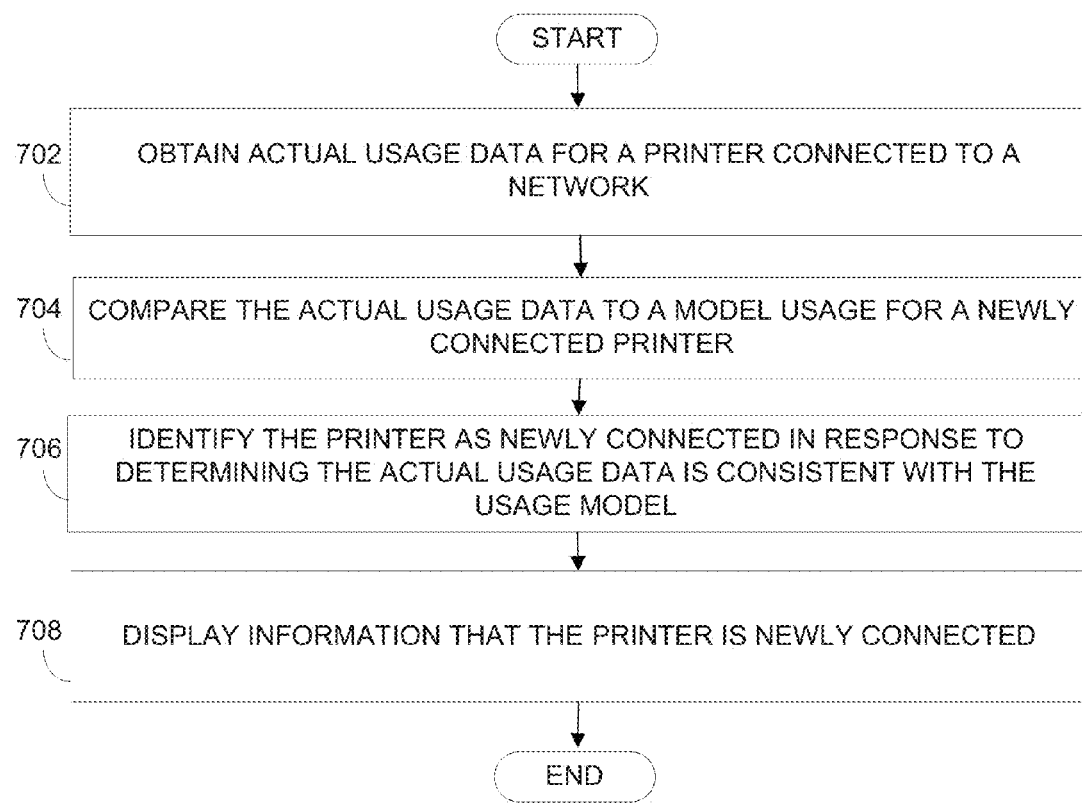
FIGS. 7 and 8 are flow diagrams depicting steps taken to implement various embodiments.

FIG. 7 is a flow diagram of operation in a system according to various embodiments. In discussing FIG. 7, reference may be made to the diagrams of FIGS. 1-6 to provide contextual examples. Implementation, however, is not limited to those examples. Starting with FIG. 7, actual usage data for a printer connected to a network is obtained (block 702). Referring back to FIGS. 2 and 5, usage module 226 or 526 may be responsible for implementing block 702.

Continuing with the flow diagram of FIG. 7, the actual usage data is compared to a usage model for a newly connected printer (block 704). Referring back to FIGS. 2 and 5, comparison module 228 or 528 may be responsible for implementing block 704.

Continuing with the flow diagram of FIG. 7, the printer is identified as newly connected in response to determining the actual usage data is consistent with the usage model (block 706). Referring back to FIGS. 2 and 5, identification module 230 or 530 may be responsible for implementing block 706.

Continuing with the flow diagram of FIG. 7, information that the printer is newly connected is displayed (block 708). Referring back to FIGS. 2 and 5, display module 232 or 532 may be responsible for implementing block 708.

Figure 8:
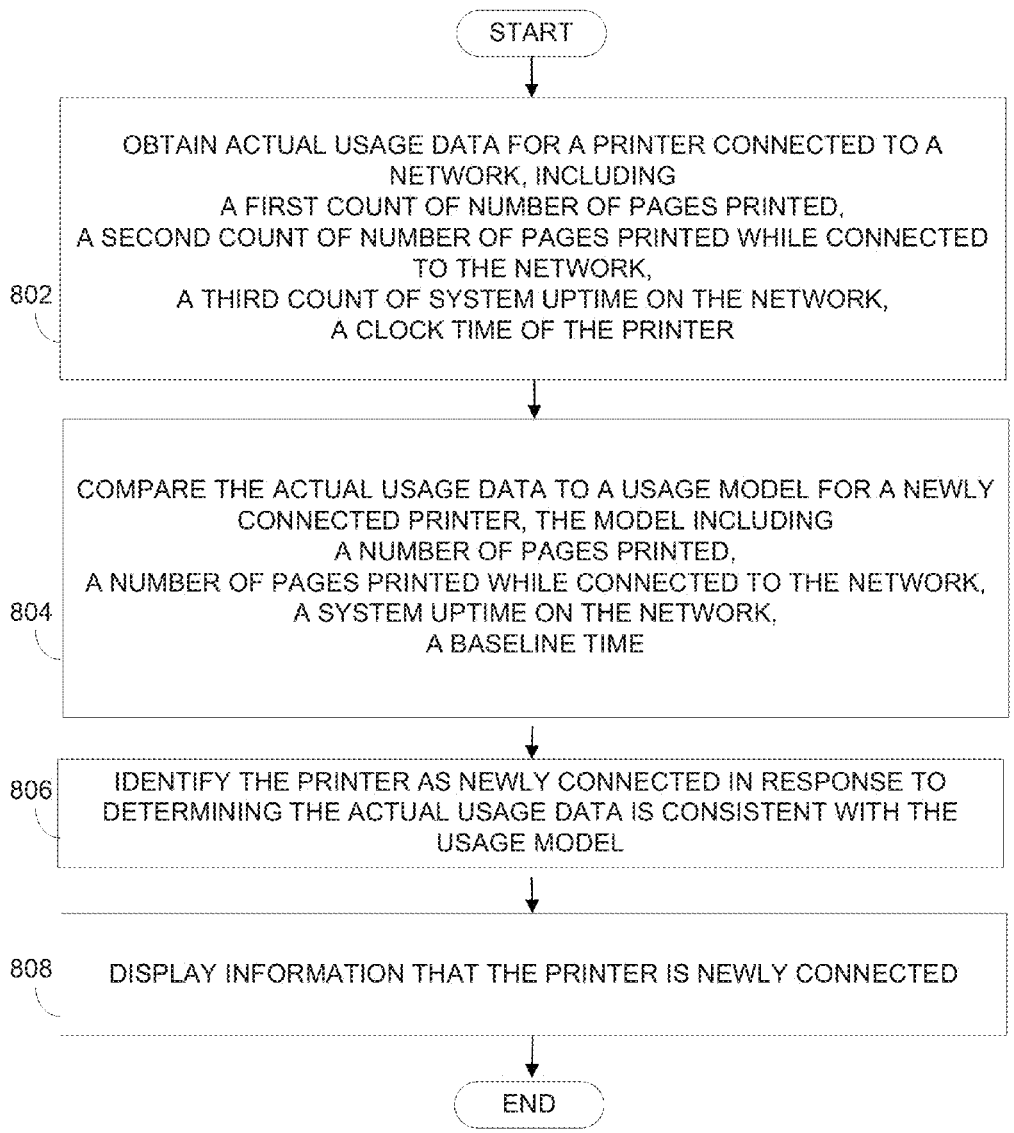

FIG. 8 is another flow diagram of operation in a system according to various embodiments. In discussing FIG. 8, reference may be made to the diagrams of FIGS. 1-6 to provide contextual examples. Implementation, however, is not limited to those examples. Starting with FIG. 8, actual usage data for a printer connected to a network is obtained (block 802), the actual usage data including a first count of number of pages printed, a second count of number of pages printed while connected to the network, a third count of system uptime on the network, and a clock time of the printer. Referring back to FIGS. 2 and 5, usage module 226 or 526 may be responsible for implementing block 802.

Continuing with the flow diagram of FIG. 8, the actual usage data is compared to a usage model for a newly connected printer, the usage model including a model number of pages printed, a model number of pages printed while connected to the network, a model system uptime on the network, and a baseline time (block 804). Referring back to FIGS. 2 and 5, comparison module 228 or 528 may be responsible for implementing block 804.

Continuing with the flow diagram of FIG. 8, the printer is identified as newly connected in response to determining the actual usage data is consistent with the usage model (block 806). Referring back to FIGS. 2 and 5, identification module 230 or 530 may be responsible for implementing block 806.

Continuing with the flow diagram of FIG. 8, information that the printer is newly connected is displayed (block 808). Referring back to FIGS. 2 and 5, display module 232 or 532 may be responsible for implementing block 808.

Although the flow diagrams of FIGS. 7 and 8 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations and examples herein should be construed in an illustrative, and not a restrictive, sense.

What is claimed is:

1. A computer-implemented method to identify a printer on a network as newly connected, the method performed by one or more processors and comprising:
    maintaining a data store comprising (i) usage data for each of a plurality of network-connected printers, and (ii) a usage standard defining one or more constraints to classify a respective printer, of the plurality of network-connected printers, as a newly connected printer;
    receiving a request, from a user device, to identify newly connected printers;
    in response to the request, comparing the usage data for each of the plurality of network-connected printers to the usage standard;
    based on the comparison, identifying one or more of the plurality of network-connected printers as newly connected; and
    providing, to the user device, an indication that the identified one or more network-connected printers are newly connected.

2. The method of claim 1, wherein the usage data includes a respective total number of pages printed by the respective printer, and wherein one of the one or more constraints of the usage standard is a limit to the total number of pages printed.

3. The method of claim 1, wherein the usage data includes a respective total number of pages printed while the respective printer is connected to the network, and wherein one of the one or more constraints of the usage standard is a limit to the total number of pages printed while the respective printer is connected to the network.

4. The method of claim 1, wherein the usage data includes a respective total number of pages printed while the respective printer is connected to the network via a wired connection, and wherein one of the one or more constraints of the usage standard is a limit to the total number of pages printed while the respective printer is connected to the network via the wired connection.

5. The method of claim 1, wherein the usage data includes a respective total number of pages printed while the respective printer is connected to the network via a wireless connection, and wherein one of the one or more constraints of the usage standard is a limit to the total number of pages printed while the respective printer is connected to the network via the wireless connection.

6. The method of claim 1, wherein the usage data includes a system uptime on the network, the system uptime corresponding to an elapsed time since the respective printer has been connected to the network without interruption, and wherein one of the one or more constraints of the usage standard is a limit to the system uptime.

7. The method of claim 1, wherein the usage data includes a printer clock time and one of the one or more constraints of the usage standard is an accepted difference between the printer clock time and a baseline time.

8. The method of claim 7, wherein the baseline time is a clock time of a computer on the network other than the respective printer.

9. The method of claim 7, wherein the baseline time is a time retrieved from a lookup table.

10. A system to identify a printer on a network as newly connected, comprising:
    one or more processors; and
    one or more memory resources storing instructions that, when executed by the one or more processors, cause the system to perform operations comprising:
        maintaining a data store comprising (i) usage data for each of a plurality of network-connected printers, and (ii) a usage standard defining one or more constraints to classify a respective printer, of the plurality of network-connected printers, as a newly connected printer;
        receiving a request, from a user device, to identify newly connected printers;
        in response to the request, comparing the usage data for each of the plurality of network-connected printers to the usage standard;
        based on the comparison, identifying one or more of the plurality of network-connected printers as newly connected; and
        providing, to the user device, an indication that the identified one or more network-connected printers are newly connected.

11. The system of claim 10, wherein the usage data includes a respective total number of pages printed by the respective printer, and wherein one of the one or more constraints of the usage standard is a limit to the total number of pages printed.

12. The system of claim 10, wherein the usage data includes a respective total number of pages printed by the respective printer while the respective printer is connected to the network, and wherein one of the one or more constraints of the usage standard is a limit to the total number of pages printed by the respective printer while the respective printer is connected to the network.

13. The system of claim 10, wherein the usage data includes a respective total number of pages printed while the respective printers is connected to the network via a wired connection, and wherein one of the one or more constraints of the usage standard is a limit to the total number of pages printed while the respective printer is connected to the network via the wired connection.

14. The system of claim 10, wherein the usage data includes a respective total number of pages printed while the respective printer is connected to the network via a wireless connection, and wherein one of the one or more constraints of the usage standard is a limit to the total number of pages printed while the respective printer is connected to the network via the wireless connection.

15. The system of claim 10, wherein the usage data includes a system uptime on the network, the system uptime corresponding to an elapsed time since the respective printer has been connected to the network without interruption, and wherein one of the one or more constraints of the usage standard is a limit to the system uptime.

16. The system of claim 10, wherein the usage data includes a printer clock time, and wherein one of the one or more constraints of the usage standard is an accepted difference between the printer clock time and a baseline time.

17. The system of claim 16, wherein the baseline time is a clock time of a computer on the network other than the respective printer.

18. A non-transitory computer-readable storage medium containing instructions for identifying a printer on a network as newly connected, wherein the instructions, when executed by a processor, cause the processor to:
  maintain a data store comprising (i) usage data for each of a plurality of network-connected printers, and (ii) a usage standard defining one or more constraints to classify a respective printer, of the plurality of network-connected printers, as a newly connected printer, wherein the usage data includes:
    a first count of a total number of pages printed by the respective printer;
    a second count of a number of pages printed by the respective printer while connected to the network;
    a third count of system uptime of the respective printer on the network, the system uptime corresponding to an elapsed time since the respective printer has been connected to the network without interruption; and
    a clock time of the respective printer;
  receive a request, from a user device, to identify newly connected printers;
  in response to the request, compare the usage data for each of the plurality of network connected printers to the one or more constraints of the usage standard, the one or more constraints of the usage standard including:
    a limit to the total number of pages printed by the respective printer;
    a limit to the number of pages printed by the respective printer while connected to the network;
    a limit to the system uptime of the respective printer on the network; and
    a limit to the clock time of the respective printer;
  based on the comparison, identify one or more of the plurality of network-connected printers as newly connected; and
  provide, to the user device, an indication that the identified one or more network-connected printers are newly connected.

19. The non-transitory computer readable storage medium of claim 18, wherein each of the identified one or more network-connected printers is connected to the network via a wired connection, and wherein the second count, for each of the identified one or more network-connected printers, is a count of pages printed via the wired connection.

20. The non-transitory computer readable storage medium of claim 18, wherein each of the identified network-connected printers is connected to the network via a wireless connection, and wherein the second count, for each of the identified one or more network-connected printers, is a count of pages printed via the wireless connection.

* * * * *